United States Patent [19]
Cotter et al.

[11] 3,770,932
[45] Nov. 6, 1973

[54] SHORT-CIRCUIT INERT GAS CONSUMABLE ELECTRODE PROCESS USING ADDITIONS OF 10-14% NITROGEN

[75] Inventors: George H. Cotter, Springville; William C. Hanes, North Tonawanda, both of N.Y.

[73] Assignee: Union Carbide Corporation, New York, N.Y.

[22] Filed: June 28, 1971

[21] Appl. No.: 157,709

[52] U.S. Cl. ................................. 219/74, 219/137
[51] Int. Cl. ............................................. B23h 9/16
[58] Field of Search ..................... 219/74, 137, 145

[56] References Cited
UNITED STATES PATENTS
2,939,942   6/1960   Scheil .................................. 219/74
3,066,215   11/1962   Espy ..................................... 219/74
2,932,721   4/1960   Kooistra................................ 219/74
1,746,191   2/1930   Devers.................................. 219/74
2,886,696   5/1959   Tuthill et al. ....................... 219/137

Primary Examiner—J. V. Truhe
Assistant Examiner—George A. Montanye
Attorney—Paul A. Rose et al.

[57] ABSTRACT

A gas shielded consumable electrode welding process for welding of materials such as 9 percent nickel steels and nitrogen stainless steels with relatively inexpensive stainless steel wire which includes utilizing a shielding gas of 10–14 percent nitrogen balance argon, helium or mixtures thereof, and a short-circuit arc deposition as the arcing process.

2 Claims, No Drawings

3,770,932

SHORT-CIRCUIT INERT GAS CONSUMABLE ELECTRODE PROCESS USING ADDITIONS OF 10-14% NITROGEN

This invention relates to gas shielded, consumable electrode wire arc welding of metals such as 9% nickel steel and nitrogen stainless steel, and more particularly, to such a welding process wherein the mechanical properties of the weld metal deposited are enhanced.

So-called cryogenic steels such as 9 percent nickel steel and nitrogen stainless steels required the use of expensive high nickel containing welding wires in order to achieve weld strengths comparable to the parent metal when welding with a gas shielded consumable electrode process. The industry, of course, is constantly seeking ways to reduce welding costs for joining these materials, particularly in the fabrication of cryogenic containers.

It is well known that nitrogen additions to stainless steels increases the ultimate strength of the stainless steel. However, nitrogen additions have never been thought to be practical for welding steels for several reasons. Nitrogen additions to the welding wire is not practical because of the expense of making a wire having the controlled amount of nitrogen necessary to achieve the weld metal strength desired. Up until now, nitrogen additions to the shielding gas were thought to be impractical because of unpredictability of the nitrogen pick-up by the weld metal.

It has unexpectedly been found that it is possible to weld metals such as 9 percent nickel steels and nitrogen stainless steels using a short-circuiting type metal transfer consumable electrode wire process (hereinafter called short arc) with a comparatively inexpensive welding wire such as Linde 309 and 310 (defined hereinafter) welding wire and a shielding gas mixture comprising of from 10 percent by volume to 14 percent by volume nitrogen with argon or helium or mixtures thereof.

Linde 309 or 310 wires have the following respective nominal compositions:

| 309 | 310 |
| --- | --- |
| up to about 0.06% carbon | up to about 0.08% carbon |
| up to about 1.75% manganese | up to about 2.5% manganese |
| about 25% chromium | about 28% chromium |
| about 12% nickel | about 20% nickel |
| Balance iron, sulfur, phosphorous and silicon | Balance iron, sulfur, phosphorous and silicon. |

Generally the use of these wires was not thought to be feasible for welding 9 percent nickel steels and nitrogen stainless steels because the coefficient of expansion of the weld metal deposited is different from the parent metal. As will be pointed out herein, this apparent obstacle has been overcome or at least been rendered insignificant by the process of this invention.

Accordingly, it is the main object of this invention to provide a method for welding metals such as 9% nickel steels or nitrogen stainless steels, which is less expensive than previous methods and yet provides enhanced mechanical properties of the weld metal.

It is a further object to provide a short-arc welding process for the welding of such metals.

It is still another object to provide a short-arc welding process for welding of 9 percent nickel steels which minimizes weld fissures even when the parts to be welded impose a restraint on the weld metal.

The objects of the invention are accomplished in a general way by establishing an arc berween a workpiece taken from the class of metals, including 9 percent nickel steel, nitrogen stainless steels and other similar metals and a consumable wire electrode containing from about 20 wt-% to about 30 wt-% chromium and from about 10 wt-% to about 25 wt-% nickel, shielding the arc with a shielding gas containing from about 10 percent to about 14 percent by volume nitrogen, the balance taken from the class of gases consisting of argon and helium or mixtures thereof, and continuously feeding such wire to the arc as the arc is moved along the joint to be welded.

More specifically, the objects are accomplished by establishing an arc between a workpiece taken from the class of metals including 9 percent nickel steel, nitrogen stainless steels and other similar metals and a consumable wire electrode containing from about 20 wt-% to about 30 wt-% chromium and from about 10 wt-% to about 25 wt-% nickel, correlating the wire feed rate and arc voltage and amperage such that the metal from the wire transfers to the workpiece when the wire short circuits to the workpiece, shielding the arc and weld zone with a shielding gas containing from about 10 percent to about 14 percent by volume nitrogen the balance taken from the class of gases consisting of argon and helium or mixtures thereof, and continuously feeding such wire to the arc as the arc is moved along the joint to be welded.

In a preferred mode of operation metal of the 9 percent nickel type is prepared for welding by forming a "Vee" groove between the sections to be welded. Usually the Vee will have a 60° included angle. The work is then connected in circuit relationship with a power supply and source of consumable wire. The consumable wire is of the Linde 309 or 310 type and is typically a wire containing about 20 wt-% to about 28 wt-% chromium and 12 wt-% to about 20 wt-% nickel. The wire is fed from the source to the work. The power supply provides electrical power between the end of the wire and the work so that when the wire makes contact with the work welding current flows and an arc is established. Shielding gas is fed at regulated flows in an annular stream around the wire and shields the weld zone. It has been found that when the shielding gas contains greater than about 14 vol.-% nitrogen porosity begins to appear in the weld metal, while nitrogen contents of less than about 10 vol.-% result in weld metal lacking in requiring ultimate strength. The invention then is predicated on the addition of nitrogen to the shielding gas in a consumable electrode gas shielded process to increase ultimate strength of the weld metal to match the strength of the parent metal while obtaining porosity free welds. Preferably, the wire feed rate and arc power are correlated to provide a short-arc type of metal transfer referred to above and described in U.S. Pat. No. 2,886,696.

The following examples are provided to aid those skilled in the art in achieving the objects of the invention. In all examples the short-arc technique as employed.

Example I

Two 3/16 inch thick 9% nickel plate were prepared with a 60° V and 1/8 inch root gap with copper backup. The wire was 0.045 dia. Linde 310 having a composition as follows in wt-%: Carbon -0.08 percent Mn 2. percent; P. 0.003 Max; S 0.003 Max; Si 0.8 percent;

Chromium 25 percent Ni 20 percent; Balance Iron. The shielding gas was 15 percent nitrogen, 85 percent argon at 50 CFH gas flow. Arc current of 180 amp at 24.5 volts was employed for the first pass at travel speed of 10 in/min. The second pass was made at 180 amps at 25 volts at 10 in/min. The third pass at 180 amp. at 25 volts at 8 in/min. The weld produced had a slight amount of porosity scattered 8–10 pores. The ultimate strength was about 107,000 p.s.i. The elongation was about 10 percent and impact strengths were about 48 ft.–lbs. at −320°F.

EXAMPLE II

In this example, the plates to be welded were 9 percent nickel steel, 3/16 inch thick with a root gap of 3/16 inch in the 60° V shape groove. The wire was the same as in Example I. The wire feed speed was correlated with the arc power to produce short-arc type metal transfer. The shielding gas contained 11% vol. nitrogen, balance argon. The first pass was made at 180 amps - 25 volts at 13 i.p.m. The second pass was made at 180 amps - 25 volts at 10 i.p.m. The weld produced was porosity free and had an ultimate strenght of about 103,000 p.s.i. The impact properties were about 48 ft.-lbs. at −320°F.

Welds of this type were repeated. In each case the shielding gas composition was changed. When the shielding gas consisted of 10 percent nitrogen and 90 percent argon the ultimate strength was about 100,000 p.s.i. Eleven percent nitrogen in argon increased the strength to about 102,000 p.s.i. Twelve percent nitrogen in argon produced a strength of about 104,000. Strength continued to increase with increased nitrogen. However, at about 15 percent nitrogen porosity began to appear in the weld as indicated by Example I. Thus, the nitrogen content is thought to be critical in the range of from 10 vol. % to about 14 vol. % with the preferred amount being about 12 percent.

A production test weld was made in a 9 percent nickel vessel, using Linde type 310 -0.045 dia. wire and 11 percent nitrogen-argon shielding gas mixture with the short arc technique. Current was about 180 amps at 25 volts for each of two passes. Operationally, this procedure was more easily controlled with more weld puddle fluidity than normally encountered when welding with high nickel content wires and helium shielding gas. The X-rays and ultrasonic tests were satisfactory. The ductility, strength and notch toughness were excellent.

While the invention is set forth with respect to certain preferred procedures it should be understood that modifications may be made thereto without departing from the spirit and scope thereof.

What is claimed is:

1. A method of electric arc welding comprising establishing an arc between a workpiece taken from the class of metals including 9 percent nickel steel, and nitrogen stainless steels, and a consumable wire electrode containing from about 20 wt-% to about 30 wt-% chromium and from about 10 wt-% to about 25 wt-% nickel, correlating the wire feed rate and are voltage and amperage such that the metal from the wire transfers to the workpiece when the wire short circuits to the workpiece; shielding the arc and weld zone with a shielding gas containing from about 10 percent to about 14 percent by volume nitrogen the balance taken from the class of gases consisting of argon and helium or mixtures thereof, and continuously feeding such wire to the arc as the arc is moved along the joint to be welded.

2. A method according to claim 1 wherein the workpiece is 9 percent nickel steel, the consumable wire electrode has the following composition in wt-%:

Carbon about 0.08
Mn about 2.0
Si about 0.8
Chromium about 25.0
Nickel about 20.0
Balance Iron and the shielding gas contains about 12 percent nitrogen the balance argon.

* * * * *